US008798665B2

(12) United States Patent
Palanki et al.

(10) Patent No.: US 8,798,665 B2
(45) Date of Patent: Aug. 5, 2014

(54) BEACON-BASED CONTROL CHANNELS

(75) Inventors: Ravi Palanki, San Diego, CA (US);
Avneesh Agrawal, San Diego, CA (US);
Alexei Gorokhov, San Diego, CA (US);
Aamod Khandekar, San Diego, CA (US); Ashwin Sampath, Princeton, NJ (US); Dexu Lin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1091 days.

(21) Appl. No.: 12/163,812

(22) Filed: Jun. 27, 2008

(65) Prior Publication Data

US 2009/0131061 A1 May 21, 2009

Related U.S. Application Data

(66) Substitute for application No. 60/988,151, filed on Nov. 15, 2007.

(51) Int. Cl.
*H04W 48/12* (2009.01)

(52) U.S. Cl.
USPC .......... 455/525; 455/67.11; 455/434

(58) Field of Classification Search
None
See application file for complete search history.

(56) References Cited

U.S. PATENT DOCUMENTS

| 5,825,758 A | 10/1998 | Heikkinen et al. |
| 5,828,962 A | 10/1998 | Ho-A-Chuck |
| 5,867,478 A | 2/1999 | Baum et al. |
| 5,920,862 A | 7/1999 | Waters |
| 5,940,765 A | 8/1999 | Haartsen |
| 5,970,414 A | 10/1999 | Bi et al. |
| 6,337,988 B1 | 1/2002 | Agin et al. |
| 6,473,619 B1 | 10/2002 | Kong et al. |
| 6,498,932 B1 | 12/2002 | Silventoinen et al. |
| 6,728,550 B1 | 4/2004 | Boehnke et al. |
| 6,985,498 B2 | 1/2006 | Laroia et al. |
| 7,302,276 B2 | 11/2007 | Bernhardsson et al. |
| 7,426,395 B2 | 9/2008 | Stephens |
| 7,450,559 B2 | 11/2008 | Schotten et al. |

(Continued)

FOREIGN PATENT DOCUMENTS

| CN | 1219081 A | 6/1999 |
| CN | 1235745 | 11/1999 |

(Continued)

OTHER PUBLICATIONS

3GPP: "3rd Generation Partnership Project; Technical Specification Group Radio Access network; Evolved Universal Terrestrial Radio access (E-UTRA); Physical channels and Modulation (Release 8)" Internet, Citation, Mar. 2008, sections 6-6.2.4 and 6.10 to 6.10.3.2 , pp. 1-65, XP002537575.

(Continued)

*Primary Examiner* — Philip Sobutka
(74) *Attorney, Agent, or Firm* — Stanton Braden

(57) ABSTRACT

Systems and methodologies are described that facilitate transmitting control information in wireless networks. Portions of bandwidth can be blanked for transmitting control information, and the control information transmitters can utilize beacon symbols to convey the control information. In this regard, interference is mitigated with respect to data transmissions over the control information bandwidth. Selected frequencies of the beacon symbols in a codeword can be used to indicate the control information. The codewords can be encoded with an error control code to provide redundancy for decoding in the presence of some interference.

38 Claims, 11 Drawing Sheets

(56) References Cited

U.S. PATENT DOCUMENTS

| | | | |
|---|---|---|---|
| 7,453,912 B2 | 11/2008 | Laroia et al. | |
| 7,522,919 B2 | 4/2009 | Yoon et al. | |
| 7,555,300 B2 | 6/2009 | Scheinert et al. | |
| 7,657,277 B2 | 2/2010 | Montojo et al. | |
| 7,751,510 B2 | 7/2010 | Budianu et al. | |
| 7,796,639 B2 | 9/2010 | Buckley et al. | |
| 7,830,907 B1* | 11/2010 | Petranovich et al. | 370/436 |
| 7,920,494 B2 | 4/2011 | Stewart et al. | |
| 8,077,649 B2 | 12/2011 | Cai | |
| 8,077,801 B2 | 12/2011 | Malladi | |
| 2001/0001609 A1 | 5/2001 | Mikuni et al. | |
| 2001/0014608 A1 | 8/2001 | Backstrom et al. | |
| 2002/0168994 A1 | 11/2002 | Terry et al. | |
| 2003/0101404 A1 | 5/2003 | Zhao et al. | |
| 2004/0022176 A1 | 2/2004 | Hashimoto et al. | |
| 2004/0190482 A1 | 9/2004 | Baum et al. | |
| 2004/0198235 A1 | 10/2004 | Sano | |
| 2004/0203734 A1 | 10/2004 | Ishii | |
| 2005/0163070 A1 | 7/2005 | Farnham et al. | |
| 2005/0254555 A1 | 11/2005 | Teague et al. | |
| 2005/0277425 A1 | 12/2005 | Niemela et al. | |
| 2006/0045050 A1 | 3/2006 | Floros et al. | |
| 2006/0111137 A1 | 5/2006 | Mori et al. | |
| 2006/0281476 A1* | 12/2006 | Lane et al. | 455/502 |
| 2006/0286995 A1 | 12/2006 | Onggosanusi et al. | |
| 2007/0021075 A1 | 1/2007 | Nakao | |
| 2007/0036066 A1 | 2/2007 | Thomas et al. | |
| 2007/0047483 A1 | 3/2007 | Khan | |
| 2007/0070967 A1 | 3/2007 | Yang et al. | |
| 2007/0082619 A1 | 4/2007 | Zhang et al. | |
| 2007/0104151 A1 | 5/2007 | Papasakellariou et al. | |
| 2007/0167160 A1 | 7/2007 | Asanuma et al. | |
| 2007/0189244 A1 | 8/2007 | Del et al. | |
| 2007/0195899 A1 | 8/2007 | Bhushan et al. | |
| 2007/0242618 A1 | 10/2007 | Sakoda et al. | |
| 2007/0248113 A1 | 10/2007 | Ko et al. | |
| 2007/0253442 A1 | 11/2007 | Yu et al. | |
| 2007/0275746 A1 | 11/2007 | Bitran | |
| 2008/0031307 A1 | 2/2008 | Fukuoka et al. | |
| 2008/0032744 A1 | 2/2008 | Khan et al. | |
| 2008/0049690 A1 | 2/2008 | Kuchibhotla et al. | |
| 2008/0056201 A1 | 3/2008 | Bennett | |
| 2008/0081598 A1 | 4/2008 | Chandra et al. | |
| 2008/0095133 A1 | 4/2008 | Kodo et al. | |
| 2008/0130612 A1 | 6/2008 | Gorokhov et al. | |
| 2008/0132263 A1 | 6/2008 | Yu et al. | |
| 2008/0144612 A1 | 6/2008 | Honkasalo et al. | |
| 2008/0232396 A1 | 9/2008 | Buckley et al. | |
| 2009/0052403 A1 | 2/2009 | Hokao | |
| 2009/0080382 A1 | 3/2009 | Chen et al. | |
| 2009/0097447 A1 | 4/2009 | Han et al. | |
| 2009/0129268 A1 | 5/2009 | Lin et al. | |
| 2009/0130979 A1 | 5/2009 | Bhushan et al. | |
| 2009/0185632 A1 | 7/2009 | Cai et al. | |
| 2009/0199069 A1 | 8/2009 | Palanki et al. | |
| 2009/0219838 A1* | 9/2009 | Jia et al. | 370/278 |
| 2009/0219839 A1 | 9/2009 | Zhao et al. | |
| 2009/0252077 A1 | 10/2009 | Khandekar et al. | |
| 2009/0257388 A1 | 10/2009 | Khandekar et al. | |
| 2010/0009687 A1 | 1/2010 | Koivisto et al. | |
| 2010/0014286 A1 | 1/2010 | Yoneda et al. | |
| 2010/0062783 A1 | 3/2010 | Luo et al. | |
| 2010/0091702 A1 | 4/2010 | Luo et al. | |
| 2010/0097972 A1 | 4/2010 | Parkvall et al. | |
| 2010/0201188 A1 | 8/2010 | Robbins | |
| 2010/0329171 A1 | 12/2010 | Kuo et al. | |
| 2011/0103286 A1 | 5/2011 | Montojo et al. | |
| 2011/0103338 A1 | 5/2011 | Astely et al. | |
| 2011/0235744 A1 | 9/2011 | Ketchum et al. | |

FOREIGN PATENT DOCUMENTS

| | | |
|---|---|---|
| CN | 1770892 A | 5/2006 |
| CN | 1909417 A | 2/2007 |
| CN | 101094433 A | 12/2007 |
| EP | 0917305 A2 | 5/1999 |
| EP | 1061705 A1 | 12/2000 |
| EP | 1420551 A2 | 5/2004 |
| EP | 1440532 | 7/2004 |
| EP | 1501328 A2 | 1/2005 |
| EP | 1679814 A2 | 7/2006 |
| JP | 11098571 A | 4/1999 |
| JP | 2004260692 A | 9/2004 |
| JP | 2004274745 A | 9/2004 |
| JP | 2005510902 | 4/2005 |
| JP | 2006505978 A | 2/2006 |
| JP | 2006135673 A | 5/2006 |
| JP | 2007097173 A | 4/2007 |
| JP | 2007129726 A | 5/2007 |
| JP | 2007515106 A | 6/2007 |
| JP | 2007221745 A | 8/2007 |
| JP | 2007527678 A | 9/2007 |
| JP | 2007533255 | 11/2007 |
| JP | 2007335913 A | 12/2007 |
| JP | 2007538462 T | 12/2007 |
| JP | 2008053858 A | 3/2008 |
| JP | 2008219637 A | 9/2008 |
| JP | 2008288736 A | 11/2008 |
| JP | 2008547269 A | 12/2008 |
| JP | 2009510975 A | 3/2009 |
| JP | 2009538584 A | 11/2009 |
| KR | 20070009707 A | 1/2007 |
| RU | 2150176 | 5/2000 |
| RU | 2165678 C2 | 4/2001 |
| RU | 2002129901 A | 3/2004 |
| RU | 2262811 | 10/2005 |
| RU | 2287902 C2 | 11/2006 |
| RU | 2307481 C2 | 9/2007 |
| TW | 200404467 | 3/2004 |
| TW | 200404472 | 3/2004 |
| WO | WO9616524 | 5/1996 |
| WO | 9809469 A1 | 3/1998 |
| WO | WO0135692 A1 | 5/2001 |
| WO | WO0178440 | 10/2001 |
| WO | WO03039057 | 5/2003 |
| WO | 03101141 A1 | 12/2003 |
| WO | WO2004019537 A2 | 3/2004 |
| WO | WO-2004043096 A2 | 5/2004 |
| WO | 2005088873 A1 | 9/2005 |
| WO | 2005109657 A1 | 11/2005 |
| WO | WO2005117283 A2 | 12/2005 |
| WO | 2006001143 A1 | 1/2006 |
| WO | WO2006007318 A1 | 1/2006 |
| WO | WO2006020032 | 2/2006 |
| WO | WO2006038694 A1 | 4/2006 |
| WO | WO2006043588 A1 | 4/2006 |
| WO | 2006086437 A1 | 8/2006 |
| WO | 2006106676 A1 | 10/2006 |
| WO | 2006138336 A1 | 12/2006 |
| WO | WO2006134032 | 12/2006 |
| WO | 2007024853 | 3/2007 |
| WO | WO2007024895 | 3/2007 |
| WO | WO2007025308 | 3/2007 |
| WO | 2007044173 A2 | 4/2007 |
| WO | WO2007044281 | 4/2007 |
| WO | 2007081130 A1 | 7/2007 |
| WO | WO2007091245 A2 | 8/2007 |
| WO | WO2007106980 | 9/2007 |
| WO | 2007119452 A1 | 10/2007 |
| WO | 2007137201 | 11/2007 |
| WO | 2007137920 A1 | 12/2007 |
| WO | 2008023928 A2 | 2/2008 |
| WO | WO2008049136 | 4/2008 |
| WO | WO2008086149 | 7/2008 |

OTHER PUBLICATIONS

Hooli K et al: "Flexible Spectrum Use between WINNER Radio Access Networks" Proc. IST Mobile & Wireless, Myconos (Greece),, Jun. 4, 2006, pp. 1-5, XP003020776 p. 1, paragraph 1, p. 2, paragraph 2.

(56) References Cited

OTHER PUBLICATIONS

International Search Report and Written Opinion—PCT/US2008/075238, International Search Authority—European Patent Office—May 11, 2009.
LG Electronics: "Multiplexing of MBMS and unicast transmission in E-UTRA downlink; R1-060054" 3GPP TSG-RAN WG1 Meeting Ad Hoc LTE, vol. R1-060054, Jan. 23, 2006, pp. 1-5, XP003016637.
NTT DoCoMo et al., "L1/L2 Control Channel Structure for E-UTRA Downlink," 3GPP TSG RAN WG1 Meeting 45, R1-061181, Shanghai, China, May 8-12, 2006, pp. 1-17.
NTT DoCoMo et al., "PUCCH Structure Considering Sounding RS Transmission in E-UTRA Uplink," 3GPP TSG RAN WG1 Meeting #50, R1-073700, Athens, Greece, Aug. 20-24, 2007, pp. 1-3.
Qualcomm Europe: "Neighbor Cell Search—Analysis and Simulations" 3GPP Draft; R1-063432, 3rd Generation Partnership Project (36PP), Mobile Competence Centre ; 650, Route Des Lucioles ; F-06921 Sophia-Antipolis Cedex ; France, no. Riga, Latvia; 20061106, Nov. 1, 2006, XP050103869 paragraph [04.1]-paragraph [04.3].
"High Performance Space Frequency Interleaved MIMO-OFDM Eigen mode Transmission systems," Vehicular Technology Conferences, 2006, VTC-2006 IEEE 64th, Sep. 25-28, 2006, pp. 1-5.

Ravi Palanki "Update on out-of-band pilot design for LBC FDD," ftp://ftp.3gpo2.org/TSGC/Working/2006/2006-12-Mau/TSG-C-2006-12-Maui/WG3/C30-20061204-045_QCOM_update_on_out-of-band_pilot_design_for_LBC_FDD.pdf.Dec. 2006.
Taiwan Search Report—TW097135373—TIPO—Feb. 3, 2012.
Nokia et al: "Issues regarding MBSFN subframes", 3GPP Draft; R1-074863, 3rd Generation Partnership Project (3GPP), Mobile Competence Centre; 658, Route des Lucioles , F-06921 Sophia-Antipolis Cedex; France, vol. RAN WG1, no. Korea; 20071030, Oct. 30, 2007, XP050108319.
3rd Generation Partnership Project; Technical Specification Group Radio Access Network; Multiplexing and channel coding (FDD); 3GPP TS 25.212 V5.10.0 (Jun. 2005) Release 5.
NEC Group: "Some issues related to MBSFN sub-frame structure", R1-071501, Ran WG1 meeting 48bis, Mar. 30, 2007, http://www.3gpp.org/ftp/tsg_ran/WG1_RL1/TSGR1_48b/Docs/R1-071501.zip.
LG Electronics: "DL PDCCH/PCFICH/RR transmission in MBSFN subframe," R1-073477, 3GPP TSG RAN WG1 #50,7.2.3, Aug. 20-24, 2007, pp. 2.

* cited by examiner

BEACON-BASED CONTROL CHANNELS

CROSS-REFERENCE TO RELATED APPLICATIONS

This application claims the benefit of U.S. Provisional Patent application Ser. No. 60/988,151 entitled "BEACON-BASED CONTROL CHANNELS" which was filed Nov. 15, 2007. The entirety of the aforementioned application is herein incorporated by reference.

BACKGROUND

I. Field

The following description relates generally to wireless communications, and more particularly to transmitting control information over wireless communications channels.

II. Background

Wireless communication systems are widely deployed to provide various types of communication content such as, for example, voice, data, and so on. Typical wireless communication systems may be multiple-access systems capable of supporting communication with multiple users by sharing available system resources (e.g. bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long-term evolution (LTE), 3GPP2, ultra mobile broadband (UMB), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

MIMO systems commonly employ multiple ($N_T$) transmit antennas and multiple ($N_R$) receive antennas for data transmission. The antennas can relate to both base stations and mobile devices, in one example, allowing bi-directional communication between the devices on the wireless network. Base stations can be heterogeneously deployed such that a mobile device can connect to a base station, or other access point, that may not be the most desirable base station from the standpoint of signal strength or quality. For example, a residential home based access point can be used by a mobile device for reasons related to security, service availability, etc.; however, the access point can be physically near a base station with a greater signal strength that can interfere with the communication between the mobile device and access point. The converse can be true as well where a device communicating with the base station comes in range of the residential access point. Thus, the interference can be less consistent, and therefore less predictable, than in conventional deployments.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating utilizing beacon signals to transmit control information over a reserved segment of bandwidth in wireless networks. In this regard, control signals can be transmitted as patterned or random beacon symbols to mitigate interference between control signals between transmitting devices. Furthermore, the transmitting devices can blank data communication transmit power over the reserved segment to mitigate impulsive interference among the devices. Moreover, the control information can be transmitted using beacon-coding techniques, for example, to generate a codeword for diverse encoding and interpretation of the control information.

According to related aspects, a method that facilitates communicating control information in wireless networks is provided. The method can comprise receiving a plurality of tones comprising a reserved control segment and decoding the reserved control segment to infer at least one beacon code sequence transmitted over the reserved control segment. The method can additionally include interpreting control information represented by the beacon code sequence.

Another aspect relates to a wireless communications apparatus. The wireless communications apparatus can include at least one processor configured to receive a plurality of tones comprising a reserved control segment and infer at least one beacon code sequence transmitted over the reserved control segment. The processor can additionally be configured to determine control information represented by the inferred beacon code sequence. The wireless communications apparatus can also include a memory coupled to the at least one processor.

Yet another aspect relates to a wireless communications apparatus for communicating control information in wireless networks. The wireless communications apparatus can include means for receiving a plurality of tones comprising a reserved control segment. The wireless communications apparatus can also include means for decoding a portion of the reserved control segment to determine at least one beacon code sequence transmitted over the reserved control segment and means for interpreting control information represented by the beacon code sequence.

Still another aspect relates to a computer program product, which can have a computer-readable medium including code for causing at least one computer to receive a plurality of tones comprising a reserved control segment and code for causing the at least one computer to infer at least one beacon code sequence transmitted over the reserved control segment. The computer-readable medium can further include code for causing the at least one computer to determine control information represented by the inferred beacon code sequence.

According to a further aspect, a method for transmitting control information in wireless networks is provided. The method can include defining a reserved control segment as a portion of bandwidth for transmitting control information as one or more beacon symbols. The method can also include encoding the control information as a plurality of beacon symbols forming a beacon codeword and transmitting the beacon codeword over the reserved control segment.

Another aspect relates to a wireless communications apparatus. The wireless communications apparatus can include at least one processor configured to define a reserved control segment as a portion of bandwidth for transmitting one or more beacon symbols representing control information. The processor can additionally be configured to encode the control information as a plurality of beacon symbols forming a beacon codeword and transmit the beacon codeword over the reserved control segment. The wireless communications apparatus can also include a memory coupled to the at least one processor.

Yet another aspect relates to a wireless communications apparatus that facilitates transmitting control information in wireless networks. The wireless communications apparatus can include means for defining a reserved control segment as a portion of bandwidth for transmitting control information as one or more beacon symbols. The wireless communications apparatus can also include means for encoding the control information as a plurality of beacon symbols forming a beacon codeword and means for transmitting the beacon codeword over the reserved control segment.

Still another aspect relates to a computer program product, which can have a computer-readable medium including code for causing at least one computer to define a reserved control segment as a portion of bandwidth for transmitting control information as one or more beacon symbols. The computer-readable medium can further include code for causing the at least one computer to encode the control information as a plurality of beacon symbols forming a beacon codeword and code for causing the at least one computer to transmit the beacon codeword over the reserved control segment.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
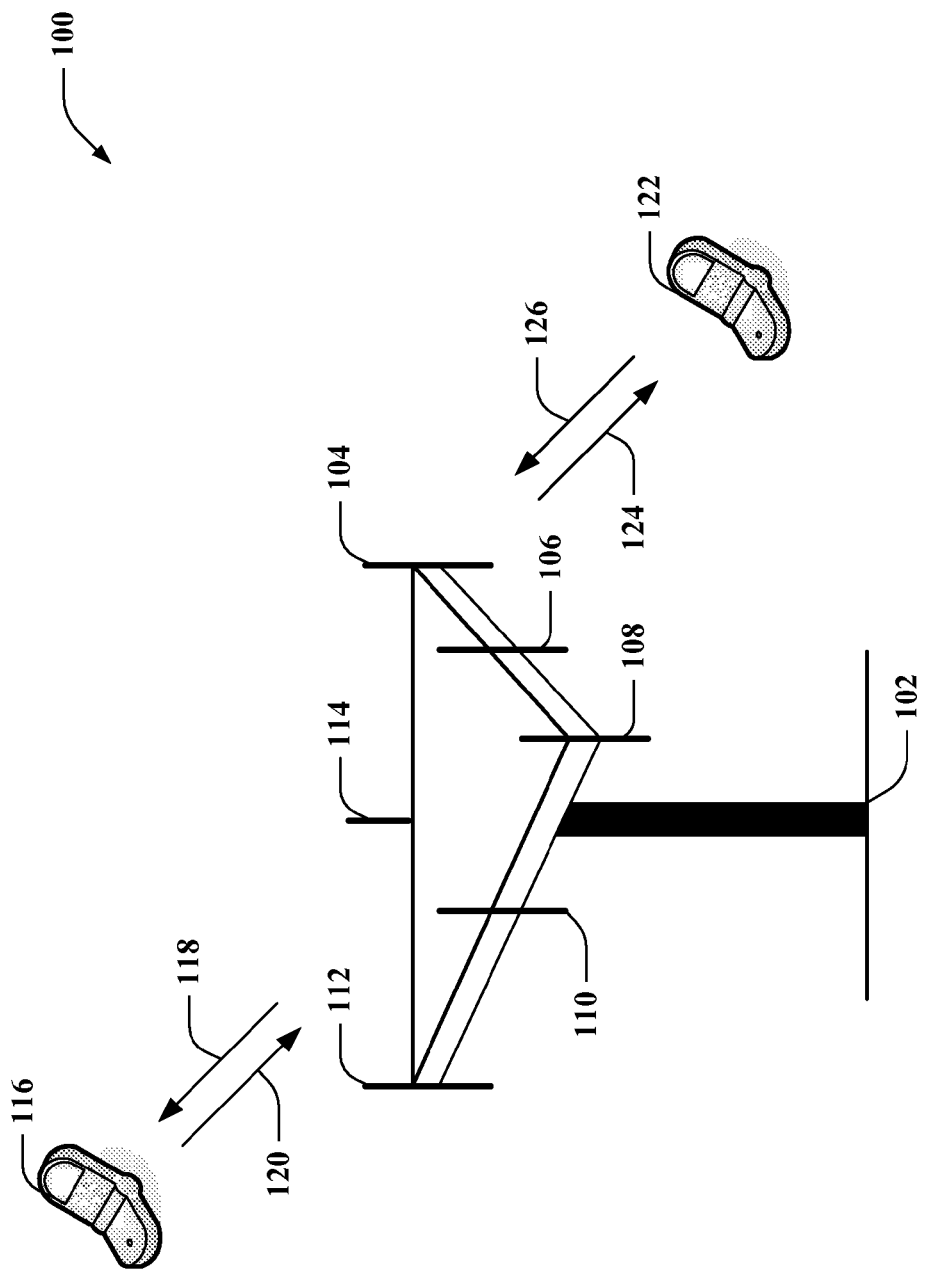
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) can be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with mobile device(s) and can also be referred to as an access point, Node B, evolved Node B (eNode B or eNB), base transceiver station (BTS) or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

The techniques described herein may be used for various wireless communication systems such as code division multiple access (CDMA), time division multiple access (TDMA), frequency division multiple access (FDMA), orthogonal frequency division multiple access (OFDMA), single carrier frequency domain multiplexing (SC-FDMA) and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). CDMA2000 and UMB are described in documents from an organization named "3rd Generation Partnership Project 2" (3GPP2).

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices. Moreover, mobile devices 116 and 122 can communicate directly with one another using a peer-to-peer or ad hoc technology as depicted.

According to an example, system 100 can be a multiple-input multiple-output (MIMO) communication system. Further, system 100 can utilize substantially any type of duplexing technique to divide communication channels (e.g. forward link, reverse link, . . . ) such as FDD, TDD, and the like. The communication channels can comprise one or more logical channels. Such logical channels can be provided for transmitting control information between the mobile devices 116 and 122 and the base station 102 (or from mobile device 116 to mobile device 122 in a peer-to-peer configuration, for example). In an example, the mobile devices 116 and 122 can send channel quality indicator (CQI) information to the base station 102 to indicate parameters regarding an allocated communication channel. Based on the CQI control information, for example, the base station 102 can allocate additional communication channel resources to the mobile devices 116 and/or 122. Additionally, the base station 102 can send control information to the mobile devices 116 and/or 122, such as acknowledgement information related to receiving data from the devices, over the control channels.

In an example, the base station 102 can be one of a plurality of base stations or access points in a wireless communications network. The network can allow connection between devices and base stations, or other access points, where the connection may not be the most desirable in view of signal strength, signal to noise ratio (SNR), etc. This allows devices to connect to base stations or other access points for other reasons, such as services provided, protocols utilized, restricted association where the mobile devices 116/122, and/or users thereof, may not have authorization to connect to a disparate base station (not shown), for example. In addition, the base station 102 can be in a user home or other area that can offer services or security not easily attainable with base station closer in proximity (and/or signal strength). Additionally, a more proximal base station can be part of a heterogeneously deployed network where the mobile devices 116/122, or users thereof, may choose to connect to a lower powered base station 102 with lower path-loss but worse SNR, etc.

For example, in some cases, it can be desirable for a mobile device to be served by a low-transmit power base station having lower path loss even though that base station can have a lower received power and lower SNR. This can be because the low-power base station can serve the mobile device while causing less interference to the network as a whole. Moreover, multiple low-power base stations can simultaneously serve distinct users or mobile devices making much more efficient use of the bandwidth as compared to the high-powered base station serving a single user/device. Thus, though mobile devices 116 and 122 are communicating with the base station 102, there can be a dominant interfering access point (not shown) and/or an interfering mobile device communicating therewith. Additionally, the interference can be impulsive, such that the base station 102 and/or mobile devices 116 and/or 122 cannot predict or account for the interference in all cases since it is not constant.

In one example, a plurality of transmitting devices (e.g. mobile devices 116 and/or 122) can reduce transmission power for non-control information over a portion of bandwidth, such as a number of tones in an OFDM context, effectively reserving the portion of bandwidth for transmitting control information. Substantially all additional transmitting devices of the wireless communication system 100 (not shown) can also reduce non-control information transmission power over the reserved control bandwidth to substantiate a reserved control segment for transmitting control information. In addition, the devices can choose not to transmit any non-control information over the segment. In this regard, the transmitters can transmit control information over the reserved control segment without data transmission interference over the reserved control segment. The reserved control portions can repeat and/or can vary over a number of time periods or frames, for example. Additionally, the reserved control segment can be contiguous or non-contiguous in time and/or frequency, for example. The mobile devices 116 and/or 122 can transmit control information by reusing the reserved control segment to mitigate interference from disparate devices.

Additionally, the mobile devices 116 and 122 can use beacon symbols to transmit control information over the reserved control segment to mitigate interference between control information transmissions for the devices 116 and 122. For example, the beacon symbols can be transmitted over a fraction of available subcarriers (e.g. a single subcarrier for optimal SNR) for a given time period by concentrating power of the mobile device 116 and/or 122 over the fraction of subcarriers. Thus, the receiving entity (e.g., base station or access point) can receive the beacon symbol(s) with high probability, as the fraction from one mobile device 116 has a lower probability of interfering with a fraction from a second mobile device 122. This is true especially as the fraction moves to a single subcarrier. In an example, the control information can be coded as one or more beacon symbols in a sequence within a number of OFDM symbols to convey the control information; the data can be conveyed in part on the position of the beacon within the OFDM symbols over a period of time. In this regard, various coding techniques can be utilized to ensure the base stations and/or access points can not only have a high probability of receiving the control information as beacon symbols, but also of receiving a sufficient portion of the coded beacon symbols to effectively decode the control information.

Figure 2:
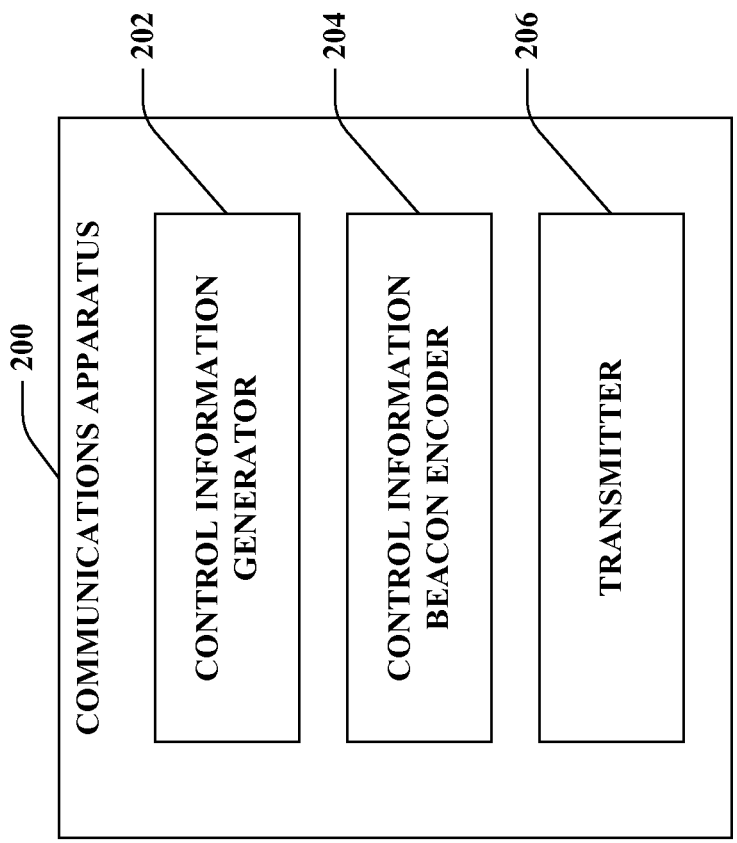
FIG. 2 is an illustration of an example communications apparatus for employment within a wireless communications environment.

Turning to FIG. 2, illustrated is a communications apparatus 200 for employment within a wireless communications environment. The communications apparatus 200 can be a base station or a portion thereof, a mobile device or a portion thereof, or substantially any communications apparatus that receives data transmitted in a wireless communications environment. The communications apparatus 200 can include a control information generator 202 that can populate a control information structure related to one or more aspects of wireless communication such as interference avoidance, signal strength, signal to noise ratio (SNR), etc., a control information beacon encoder 204 that can encode the control information into one or more beacon symbols or beacon code sequences, and a transmitter 206 that can transmit the control information over the one or more beacon codes or code sequences.

According to an example, a portion of bandwidth can be defined for transmitting control information from the communications apparatus and related apparatuses (not shown). In one example, the communications apparatus 200 can be one of a plurality of mobile devices in a wireless communications network that communicates with one or more base stations and/or access points (or more generally, a transmitter communicating with a receiver) or vice versa. The wireless communications network can support mobile device connection with a chosen access point or base station such that the most optimal base station (e.g., determined by optimal signal strength, SNR, and/or the like) may not be chosen for communication. This can be based on a variety of factors, including services offered, accessibility or activity level for the access point, and/or the like, for example. In this regard, there can be more physically desirable access points having higher SNR than the one chosen for connection by the communications apparatus 200 causing interference therewith. Moreover, the interference can be unpredictable in time and strength, and therefore unaccounted for using conventional interference avoidance techniques.

According to an example, the control information generator 202 can create a control information structure to transmit to the base stations or access points, which can be related to communication metrics for the communications apparatus 200 and the one or more base stations or access points (e.g., CQI or SNR information). In another example, the control information can relate to a request to clear up interference, such as by coordinating channels for blanking or transmitting less power among disparate communications apparatuses, according additional resources to the communications apparatus 200, and/or the like. The control information beacon encoder 204 can select one or more beacon signals for transmitting the control information. For example, the control information beacon encoder 204 can select a portion of the tones, or a single tone for example, in at least one available time frame of a reserved control segment for transmitting control information by concentrating power of the transmitter 206 over the portion of tones or single tone. This can be a tone or subcarrier of an OFDM symbol, for example. Additionally, the control information beacon encoder 204 can encode control information over a sequence of beacons over time (e.g. over a plurality of OFDM symbols of a reserved control segment) to allow formation of a codeword that can be used to interpret the control information. For example, the codeword can be represented by frequency tones chosen for the beacons across the OFDM symbols. In one example, the codeword can be verified to ensure its validity.

Moreover, in one example, the control information beacon encoder 204 can provide error control coding to allow sufficient decoding where a portion of the beacon symbols of a beacon codeword are received. One possible error control coding can utilize a Reed-Solomon code that lengthens the beacon code to provide redundancy and/or the like. Additionally or alternatively, the code can be one or more of a convolutional code, linear block code, turbo code, and/or the like. Using such error coding can allow the beacon codeword to be interpreted even when some beacon symbols of the code are interfered or otherwise erroneously received. Moreover, different communications apparatuses 200 can use different error coding; accordingly, a sector identifier, or other transmitter/receiver identifier, can be sent with the code to aid in separating the beacon codes, in one example. Additionally, a codeword or error encoded codeword can be scrambled according to another example. For instance, the codeword, and/or representative frequency tones chosen, can be modified by a sector or communications apparatus 200 specific identifier or sequence to differentiate the beacon codewords of the communications apparatus 200.

Figure 3:
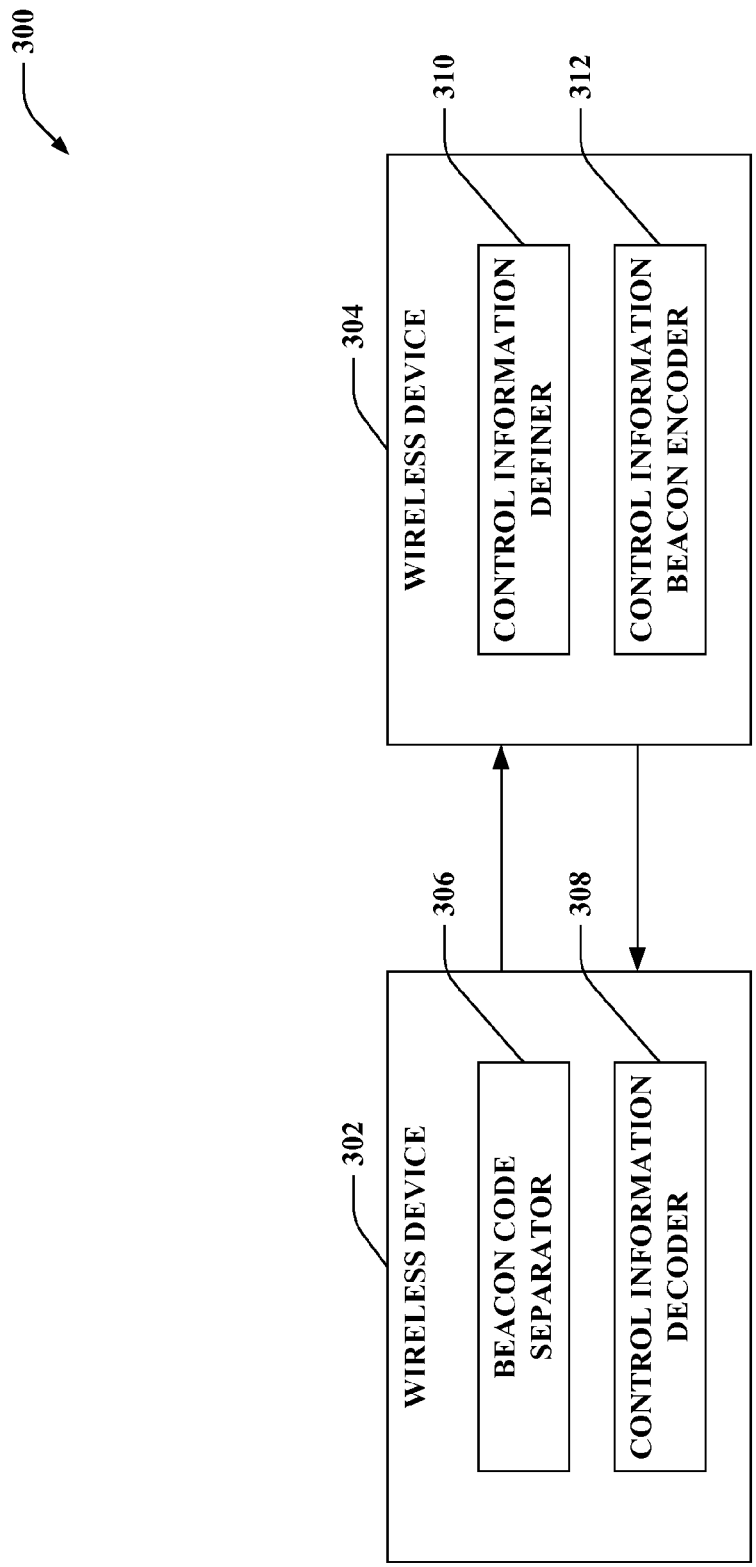
FIG. 3 is an illustration of an example wireless communications system that effectuates communicating control information in wireless networks.

Now referring to FIG. 3, illustrated is a wireless communications system 300 that can facilitate transmitting control information with low probability of interference, for example in heterogeneously deployed wireless communications networks. The system 300 includes a wireless device 302 that can communicate with a wireless device 304 (and/or any number of disparate devices (not shown)). The wireless device 302 can transmit information to the wireless device 304 over a forward link channel; further wireless device 302 can receive information from the wireless device 304 over a reverse link channel. Moreover, system 300 can be a MIMO system. Additionally, the system 300 can operate in an OFDMA wireless network (such as 3GPP, 3GPP LTE, etc., for example). Also, the components and functionalities shown and described below in the wireless device 302 can be present in the wireless device 304 as well and vice versa, in one example. In this regard, the wireless device 302 and wireless device 304 can be a base stations, mobile devices, and/or portions thereof, for example. In one example, wireless device 302 can be one of substantially similar devices, such as a group of base stations, where wireless device 304 can be of a different class of device, such as a mobile device.

The wireless device 302 includes a beacon code separator 306 that can distinguish or disambiguate beacon code sequences from a plurality of transmitters and a control information decoder 308 can that determine control information comprised in the beacon code sequences. For example, the received beacon code sequences can comprise one or more codewords from various transmitters. The codewords, as described, can indicate control information, which can be decoded by the control information decoder 308 for utilization in subsequent communication. For instance, in one example, the control information can relate to requesting blanking by a disparate transmitter (which can be interfering with the requesting transmitter) over a portion of bandwidth.

The wireless device 304 includes a control information definer 310 that can create control information to transmit to one or more receivers. For example, the control information can relate to an interference avoidance message, as mentioned, to indicate a desire to transmit over certain portions of bandwidth without interference. The control information can additionally relate to CQI information that can be utilized by the receiver to accord additional communications resources to the wireless device 304, for example, an SNR, and/or the like. The wireless device 304 can additionally comprise a control information beacon encoder 312 that can define a beacon symbol, or a codeword comprising a sequence of beacon symbols, that represent the control information desired for sending to the wireless device 302.

In one example, the wireless device 302 and wireless device 304 can be communicating in a heterogeneously deployed wireless network that allows connections other than those most desirable according to signal strength/SNR. Additionally, the network can be one communicating using OFDMA such that a number of frequency tones can be defined over given time periods and utilized for communication. Thus, available frequency can be divided into the tones representing a portion of frequency (e.g., a subcarrier) over a time period (such as an OFDM symbol, symbol period, etc.) as described. The wireless device 304 can blank transmission power over a reserved control segment and can transmit only control information over the tones. Similar wireless devices of the wireless network (e.g., a portion of mobile devices or a portion of base stations, not shown) can also blank on the control channels to substantiate multiple access control information transmission over the reserved segment of bandwidth reserved for transmitting control information. The reserved control segment can repeat over a number of time periods or frames, as described, for example.

The control information definer 310 can generate data related to resources received from the wireless device 302 in prior communication, a general signal quality, presence of interference, and/or the like for instance. In one example, data channel resources can be received for transmitting information to the wireless device 302; the control information can relate to the channel resources. For example, the control information can relate to a quality of communication over the resources, SNR, and/or the like. In addition, the control information can relate to avoiding interference; thus, the data can relate to detected interference and the desire to minimize the interference, transmit over different resources, requesting a decrease in the interference from interfering devices, and/or the like. The wireless device 302 can honor this request in a variety of ways, such as by requesting or requiring devices to reduce transmit power over certain time periods and/or frequencies, etc.

The control information beacon encoder 312 can generate beacon symbols and/or beacon codewords related to the control information. This can be accomplished such that position of the beacon codes within a subcarrier of an OFDM symbol, for example, can indicate information decodable by the wireless device 302, and a sequence of such positions allows more verbose transmission of the control information. Moreover, multiple OFDM symbols of a given symbol period can be chosen for transmitting beacon symbols, in one example. In addition, the control information beacon encoder 312 can apply error control codes to the codeword. For example, a Reed-Solomon code, convolutional code, linear block code, turbo code, etc. can be utilized, as described above, to provide redundancy in the code to allow effective decoding from a portion of the codeword where a portion is interfered or otherwise erroneously received. To differentiate the error coding, the wireless device 304 can utilize the control information beacon encoder 312 to include a sector identifier, or other identifier, with the beacon symbols. Additionally or alternatively, the codeword can be scrambled, as described, to identify the wireless device 304, for example, where beacons are received from other sectors.

Such scrambling can be performed by altering the beacon symbols according to an identifier. For example, where tones 9, 14, 5, and 2 are chosen from one or more OFDM symbols (e.g., tone 9 is chosen from OFDM symbol 1, tone 14 from OFDM symbol 2, tone 5 from OFDM symbol 3, and tone 2 from OFDM symbol 4), scrambling can result in swapping tones (e.g. 5, 2, 9, 14, where the position of the tones in the first and third OFDM symbols are swapped as well as the second and fourth) and/or altering tones (e.g., 10, 15, 6, 3, where each tone index for a given OFDM symbol is incremented by 1) of the OFDM symbols where such can be specific for a given sector. Subsequently, the received beacon symbols can be descrambled and utilized to identify the transmitting wireless device or sector related thereto. It is to be appreciated that more than one tone can be utilized for a given OFDM symbol, and thus can be shifted, scrambled, and/or the like. According to an example, the control information beacon encoder 312 can additionally encode data in beacons depending on the deployment or communication; for example, beacons can be utilized for communicating data in macrocell sectors whereas the beacons can be used for transmitting control information, as described herein, for heterogeneous deployments. The wireless device 304 can transmit, and the wireless device 302 can receive, the beacon encoded control information.

Upon receiving the beacons, the beacon code separator 306 can distinguish between beacon codes of various transmitting wireless devices. Initially, in one example, the beacon code separator 306 can estimate a background interference level to detect presence of a beacon symbol (e.g., as it is transmitted by concentrating power of the wireless device 304 over a portion of bandwidth). This can be accomplished, for example, by comparing a power on a subcarrier (P) to the estimated interference level (I) to determine if $P/I >= T$, where T is a determined threshold level, if so, the symbol can be considered a beacon symbol.

As previously described, where the beacon symbol, or codeword, is transmitted with error control coding, such as a Reed-Solomon code, the beacon code separator 306 can utilize the coding to account for error in transmission. In addition, where the beacon codes are sent with a sector identifier (or other identifier) or use a scrambled code, as described above, such identification can be used to differentiate and correlate the beacon symbols with a respective transmitting device or devices, such as the wireless device 304, or one or more receiving devices. Additionally, soft information, such as beacon tone power/phase, subcarrier signal strength ranking, codeword validity, and/or the like can be utilized to partially or fully differentiate and identify the beacon sequences.

Moreover the beacon code separator 306 can utilize a similarity threshold to determine beacon code sequences. For example, where multiple sequences are received, determining the sequences can be subject to determine one or more spurious sequences that were not actually transmitted, but are a combination of disparate transmitted beacon symbols (e.g., a valid codeword is formed by chance from beacon symbols transmitted by disparate transmitters). Thus, codewords can be checked for similarity to one another to determine whether a given codeword is spurious. For example, a number of beacon symbols occurring in a codeword being detected can be compared to the beacon symbols of one or more disparate codewords to determine if one or more of the beacon symbols occurs in other codewords, and if so how many other codewords. If over a threshold, the codeword can be determined as a spurious codeword, in one example.

When the beacon code separator 306 identifies the beacon sequence for the wireless device 304, the beacon sequence can be decoded to interpret control information by the control information decoder 308. By utilizing the reserved segment to transmit control information, interference from other transmitting wireless devices can be mitigated due in part to blanking the reserved segment with respect to non-control information transmissions as described. Additionally, interference from disparate wireless devices can occur with low probability as the transmitters can have substantially unique beacon sequences (e.g., by random selection, planning, utilizing error control coding, etc.) that typically occupy different subcarriers. Additionally, to the extent there is interference on one or more subcarriers, the error control coding techniques described above can be utilized to improve decoding in the face of some interference. Thus, the control information, which can include interference avoidance requests/information, can be effectively communicated from the wireless device 304 to the wireless device 302.

Figure 4:
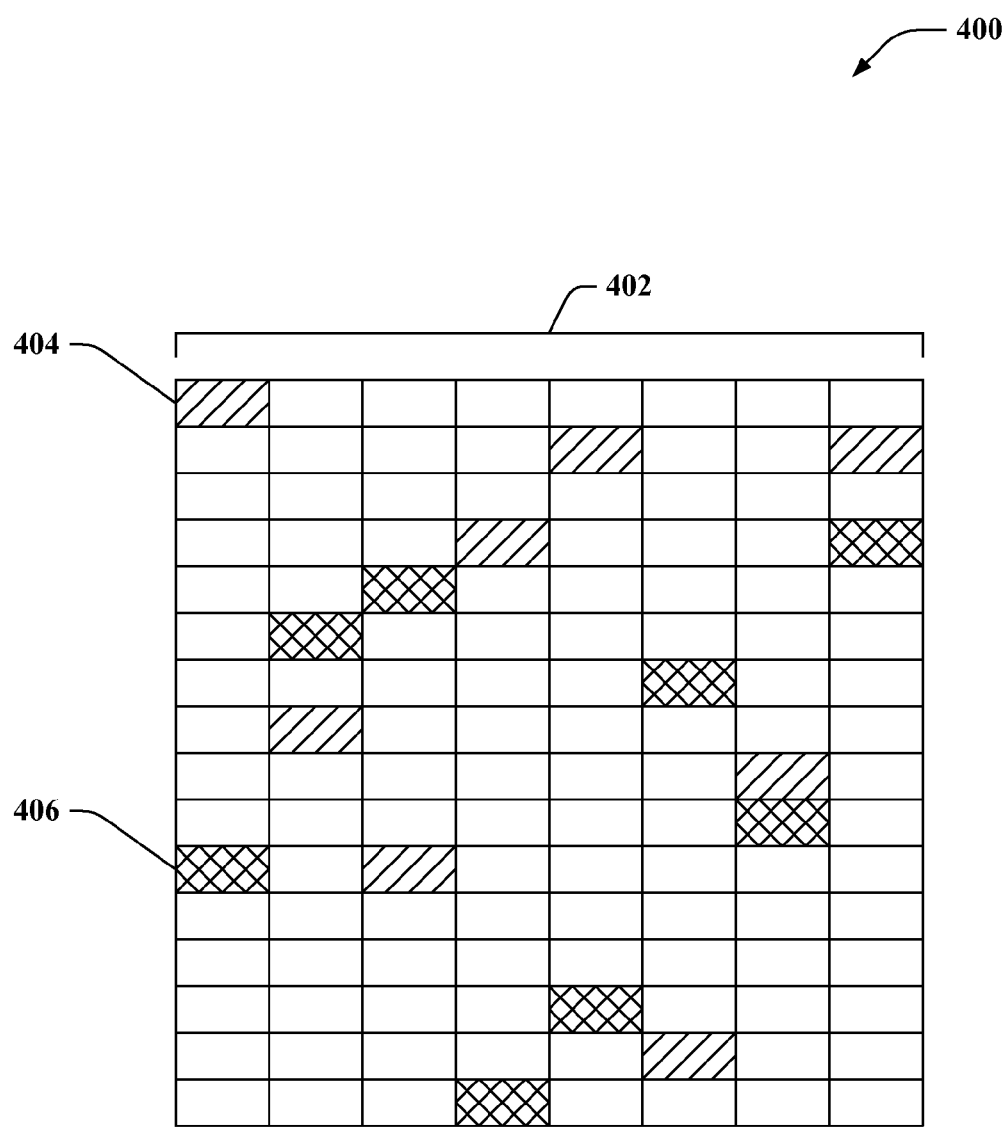
FIG. 4 is an illustration of example bandwidth for communicating control information.

Now referring to FIG. 4, an example portion of bandwidth 400 utilized to transmit control information over time is shown. The bandwidth, which can be a portion of a reserved control segment, can be represented as a number of OFDM symbols 402 (8 shown here for example) having a number of frequency tones (16 shown here for example) over which to communicate control information, such as interference avoidance information/requests, CQI information, SNR information, and/or the like. It is to be appreciated that more or less OFDM symbols and/or subcarriers within the OFDM symbols can be utilized for transmitting control information; this figure is representative of one of substantially limitless configurations for use with the described subject matter. Additionally, the OFDM symbols can represent one or more frames, a portion of a frame, and/or preamble thereof reserved for control information. Moreover, the reserved control segment can be a number of contiguous tones over contiguous symbol periods, or can be spread non-contiguously throughout a frame. Also, the reserved control segment can vary per frame. A device can communicate control information with another device in a wireless mobile network, as described supra, using a portion of the bandwidth. As described, for example, receivers of the beacon symbol can blank transmission power over the OFDM symbols 402 to decrease possible interference over the OFDM symbols 402.

Tones 404 and 406 can represent beacon symbols from disparate transmitters on an OFDM symbol. Like patterned tones throughout the remainder of OFDM symbols in the bandwidth 402 can represent beacon symbols in the OFDM symbols that form a beacon sequence or codeword for transmitting control information from the respective transmitter. Accordingly, transmitters of the beacon symbols can transmit by concentrating power at the corresponding tones, and the tones can be separated and decoded by a receiver of the bandwidth to interpret the transmitter-specific control information. As described, the beacon symbols can be detected by looking at power and interference estimations according to a threshold. Moreover, as described, the chosen tones in the OFDM symbols can indicate information related to control information and/or decoding thereof For example, the tones can relate to an identifier of the transmitter in addition to the desired control information. In addition, one or more of the coding techniques, including the error control coding techniques, can be applied to the beacon symbols as described.

Figure 5:
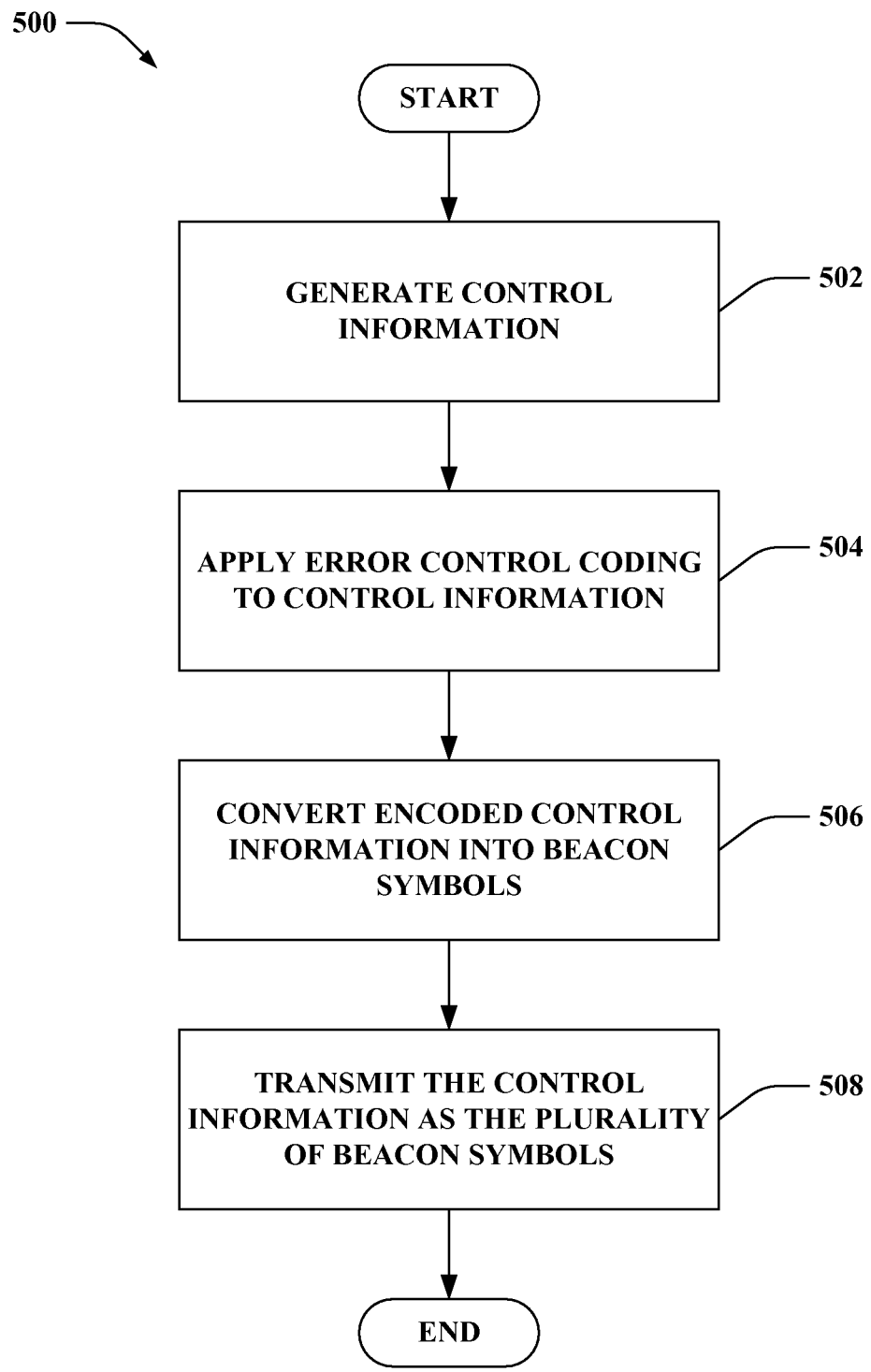
FIG. 5 is an illustration of an example methodology that facilitates communicating control information.
Figure 6:
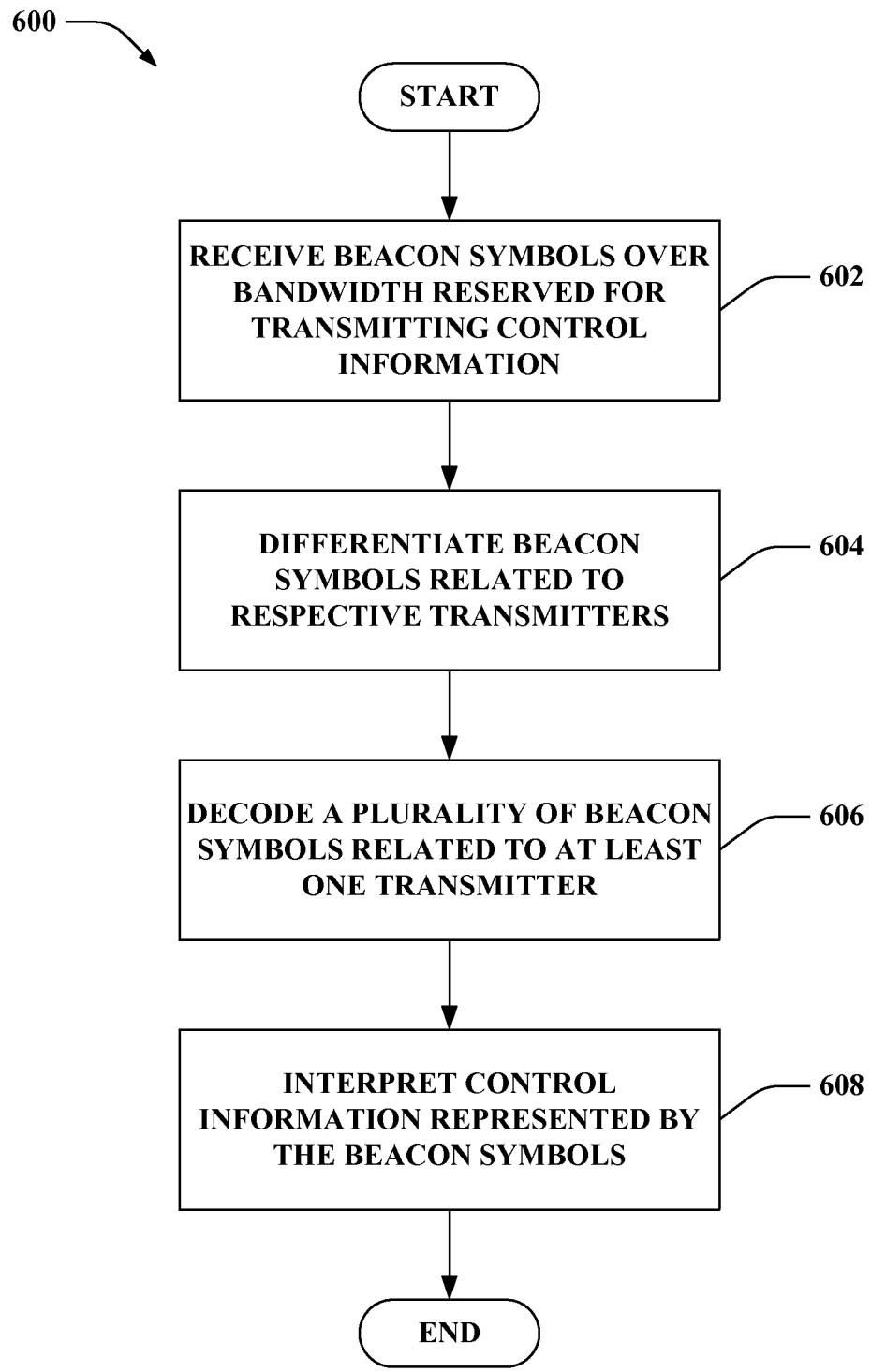
FIG. 6 is an illustration of an example methodology that facilitates receiving control information as a plurality beacon symbols.

Referring to FIGS. 5-6, methodologies relating to transmitting control information with a high probability of successful decoding in heterogeneous wireless network deployments are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Turning to FIG. 5, illustrated is a methodology 500 that facilitates transmitting control information as a plurality of beacon symbols. At 502, control information is generated. The control information can relate to an interference avoidance request, communication quality on a data communication channel (SNR or CQI), for example, or other information related to allocated resources. At 504, error control coding can be applied to the control information. As described, this can provide a level of redundancy for more successful decoding even where portions of the symbols are interfered. Additionally, the error control coding can allow for differentiating the beacon symbols from beacon symbols of other control information transmissions. In one example, a Reed-Solomon code and/or the like can be utilized as described above. This code can be scrambled according to an identifier related to transmitting the beacon symbols. In another example, the code can be modified according to an identifier for differentiation and/or an identifier can be sent with the beacon symbols in yet another example.

At 506, the encoded control information can be converted into beacon symbols. For example, the beacon symbols can be converted for transmission over a reserved segment reserved by disparate transmitters for transmitting control information. Moreover, as described, the beacon symbols can represent the control information, for example, based at least in part on the chosen tone within the frequency. For example, where the beacon symbols are implemented over a plurality of OFDM symbols; the subcarrier position in the OFDM symbols can indicate desired data. At 508, the control information can be transmitted as the plurality of beacon symbols to one or more receivers for subsequent decoding thereof.

Now referring to FIG. 6, a methodology 600 that facilitates receiving and interpreting control information as one or more beacon symbols is illustrated. At 602, beacon symbols are received over bandwidth reserved for transmitting control information. As described, one or more transmitters can utilize the beacon symbols to convey control information in wireless networks that are subject to impulsive interference. Utilizing beacon symbols over a reserved segment, as described, can create a higher probability of successfully receiving and decoding the control information. Additionally, the beacons can be identified, in one example, by comparing a power level to an interference estimation and evaluating the comparison against a threshold. At 604, one or more sets of beacon symbols are differentiated from one or more disparate sets of beacon symbols. This can occur, in one example, at least in part by verifying validity of a codeword formed by the beacons. For example, different devices can transmit control information using the same portion of bandwidth, using disparate frequencies in given time periods with high probability.

Once differentiated, at 606, a plurality of beacon symbols related to at least one transmitter can be decoded. In this regard, the plurality of beacon symbols from the transmitter can form a codeword where the tone chosen for transmitting the plurality of beacon symbols can indicate control information. Additionally, the beacon symbols can further be error control encoded using one or more encoding techniques, such as Reed-Solomon, convolutional coding, block coding, turbo coding, etc. In this regard, the beacon symbols can first be predicted by the error control coding technique used. This can identify symbols that may have been interfered in transmission, in one example. Additionally, the error control coding technique can identify the transmitter of the symbols by an explicit identifier and/or by a scrambling or multiplier used in the encoding. At 608, control information represented by the beacon symbols can be interpreted.

It will be appreciated that, in accordance with one or more aspects described herein, inferences can be made regarding selecting portions of bandwidth over which to transmit control information as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences pertaining to available portions of bandwidth for transmitting control information, portions that are utilized by disparate devices, existence of a scheme for transmitting the control information, interference or activity level of one or more devices or base station, beacon coding schemes to utilize, identifiers to include in the beacon coding schemes, and/or the like.

Figure 7:
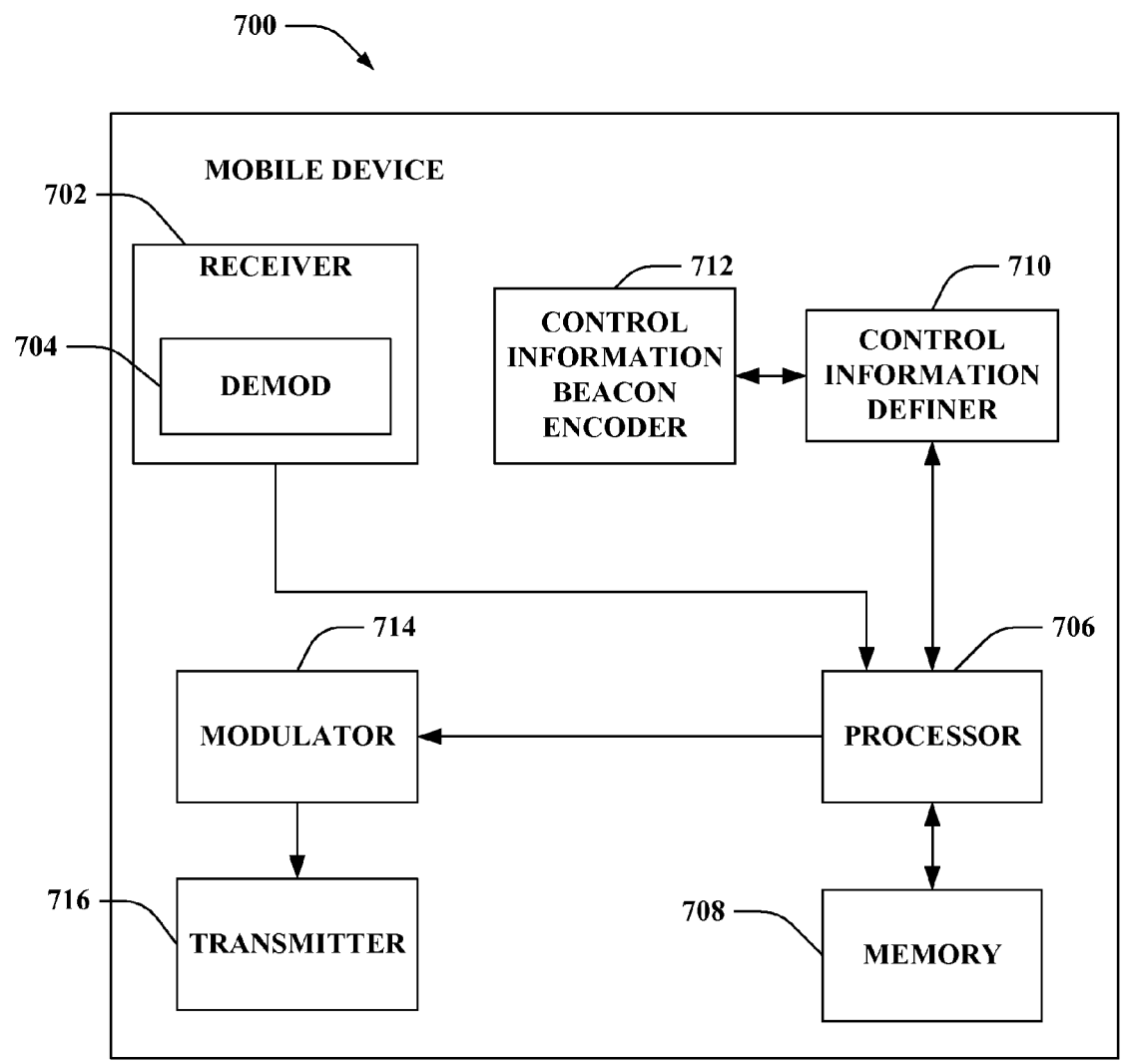
FIG. 7 is an illustration of an example mobile device that facilitates transmitting control information as one or more beacon symbols.

FIG. 7 is an illustration of a mobile device 700 that facilitates transmitting control information over a plurality of beacon symbols. Mobile device 700 comprises a receiver 702 that receives a signal from, for instance, a receive antenna (not shown), performs typical actions on (e.g. filters, amplifies, downconverts, etc.) the received signal, and digitizes the conditioned signal to obtain samples. Receiver 702 can comprise a demodulator 704 that can demodulate received symbols and provide them to a processor 706 for channel estimation. Processor 706 can be a processor dedicated to analyzing information received by receiver 702 and/or generating information for transmission by a transmitter 716, a processor that controls one or more components of mobile device 700, and/or a processor that both analyzes information received by receiver 702, generates information for transmission by transmitter 716, and controls one or more components of mobile device 700.

Mobile device 700 can additionally comprise memory 708 that is operatively coupled to processor 706 and that can store data to be transmitted, received data, information related to available channels, data associated with analyzed signal and/or interference strength, information related to an assigned channel, power, rate, or the like, and any other suitable information for estimating a channel and communicating via the channel. Memory 708 can additionally store protocols and/or algorithms associated with estimating and/or utilizing a channel (e.g., performance based, capacity based, etc.).

It will be appreciated that the data store (e.g., memory 708) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ES- DRAM), Synchlink DRAM (SLDRAM), and direct Rambus RAM (DRRAM). The memory 708 of the subject systems and methods is intended to comprise, without being limited to, these and any other suitable types of memory.

Processor 706 can further be operatively coupled to a control information definer 710 that can generate control information related to communications with one or more base stations or other access points (e.g., interference avoidance request, SNR, CQI, and/or the like) and a control information beacon encoder 712 that can utilize beacon symbols to convey control information. For example, a portion of bandwidth can be reserved, in one example, for transmitting control information such that disparate mobile devices in the wireless network blank power for non-control information transmissions over the reserved portion. It is to be appreciated that other similarly classed devices (e.g., base stations, or more specifically, similarly classed base stations, such as macro and pico, or portions thereof) of a wireless network can likewise blank power over a portion of bandwidth reserving such for transmitting control information; this is but one example. The control information beacon encoder 712 can generate a plurality of beacon symbols that indicate the control information (e.g., by a location in the bandwidth). In one example, the bandwidth can comprise a plurality of contiguous OFDM symbols, and the beacon symbols can be defined over subcarriers of the OFDM symbols where the chosen subcarrier can be indicative of control information. Additionally, the control information beacon encoder 712 can apply one or more error control coding schemes as described above.

Mobile device 700 still further comprises a modulator 714 and transmitter 716 that respectively modulate and transmit signals to, for instance, a base station, another mobile device, etc. Although depicted as being separate from the processor 706, it is to be appreciated that the control information definer 710, control information beacon encoder 712, demodulator 704, and/or modulator 714 can be part of the processor 706 or multiple processors (not shown).

Figure 8:
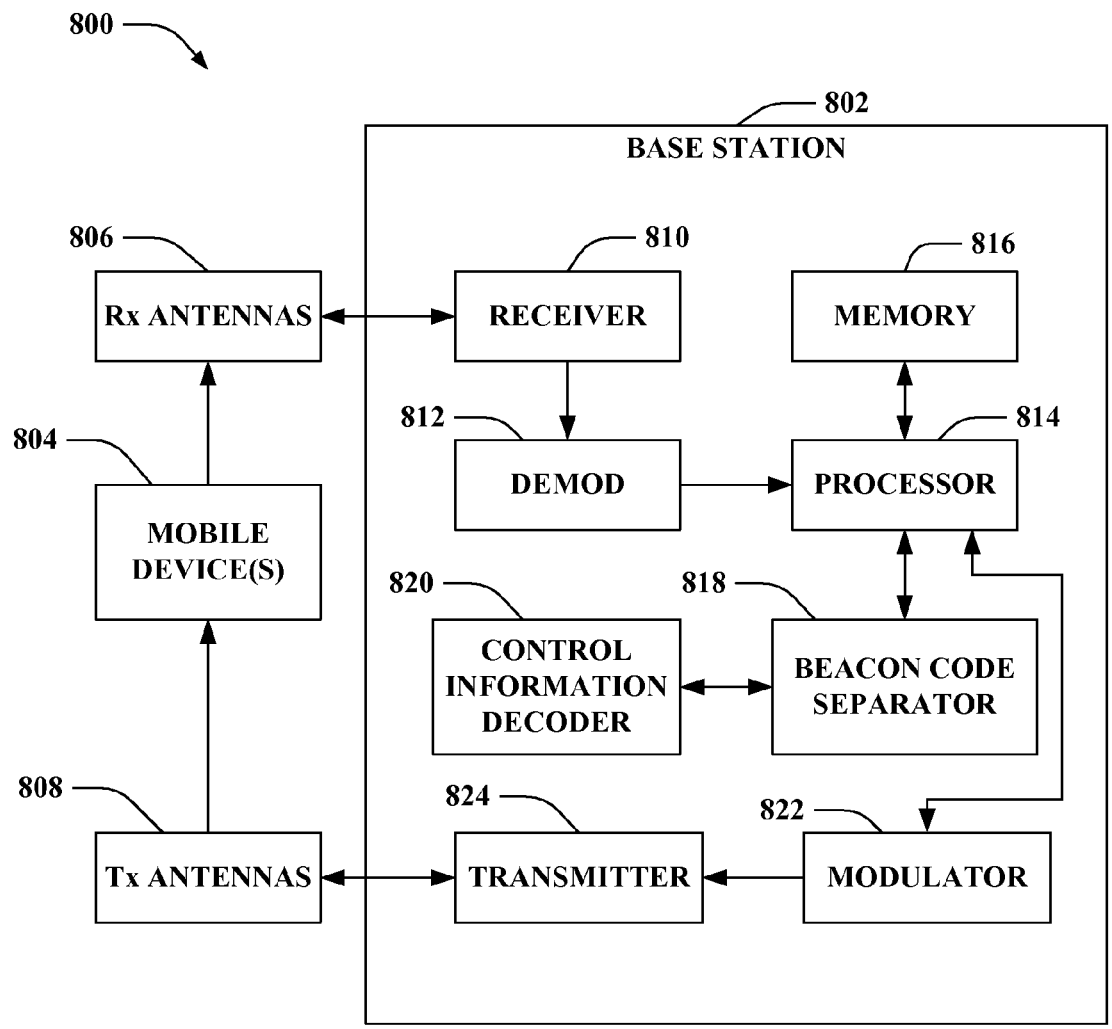
FIG. 8 is an illustration of an example system that facilitates receiving control information over blanked portions of bandwidth.

FIG. 8 is an illustration of a system 800 that facilitates blanking on portions of bandwidth reserved for control information and decoding control information sent as beacon symbols over the portions. The system 800 comprises a base station 802 (e.g., access point, . . . ) with a receiver 810 that receives signal(s) from one or more mobile devices 804 through a plurality of receive antennas 806, and a transmitter 824 that transmits to the one or more mobile devices 804 through a transmit antenna 808. Receiver 810 can receive information from receive antennas 806 and is operatively associated with a demodulator 812 that demodulates received information. Demodulated symbols are analyzed by a processor 814 that can be similar to the processor described above with regard to FIG. 7, and which is coupled to a memory 816 that stores information related to estimating a signal (e.g., pilot) strength and/or interference strength, data to be transmitted to or received from mobile device(s) 804 (or a disparate base station (not shown)), and/or any other suitable information related to performing the various actions and functions set forth herein. Processor 814 is further coupled to a beacon code separator 818 that differentiate a number of beacon symbols or codewords received over a reserved segment of bandwidth reserved for transmitting control information and a control information decoder 820 that can decode the control information from the differentiated beacon symbols/codewords.

For example, the beacon code separator 818 can differentiate between a number of received beacon symbols or codewords that indicate control information as described. Moreover, the control information decoder 820 can decode control information received as a plurality of beacon symbols as described above. For example, the control information can be sent over the reserved portion of bandwidth along with data from other mobile device(s). However, utilizing the reserved segment can increase probability of successful receipt and thus decoding of the control information as mobile devices 804 blank on the reserved segment reserved for transmitting beacon encoded control information and transmit using the multiple access mechanism described above. Additionally, the beacon symbols can be coded to allow determination of a mobile device 804 transmitting the symbols as described previously. Furthermore, although depicted as being separate from the processor 814, it is to be appreciated that the beacon code separator 818, control information decoder 820, demodulator 812, and/or modulator 822 can be part of the processor 814 or multiple processors (not shown).

Figure 9:
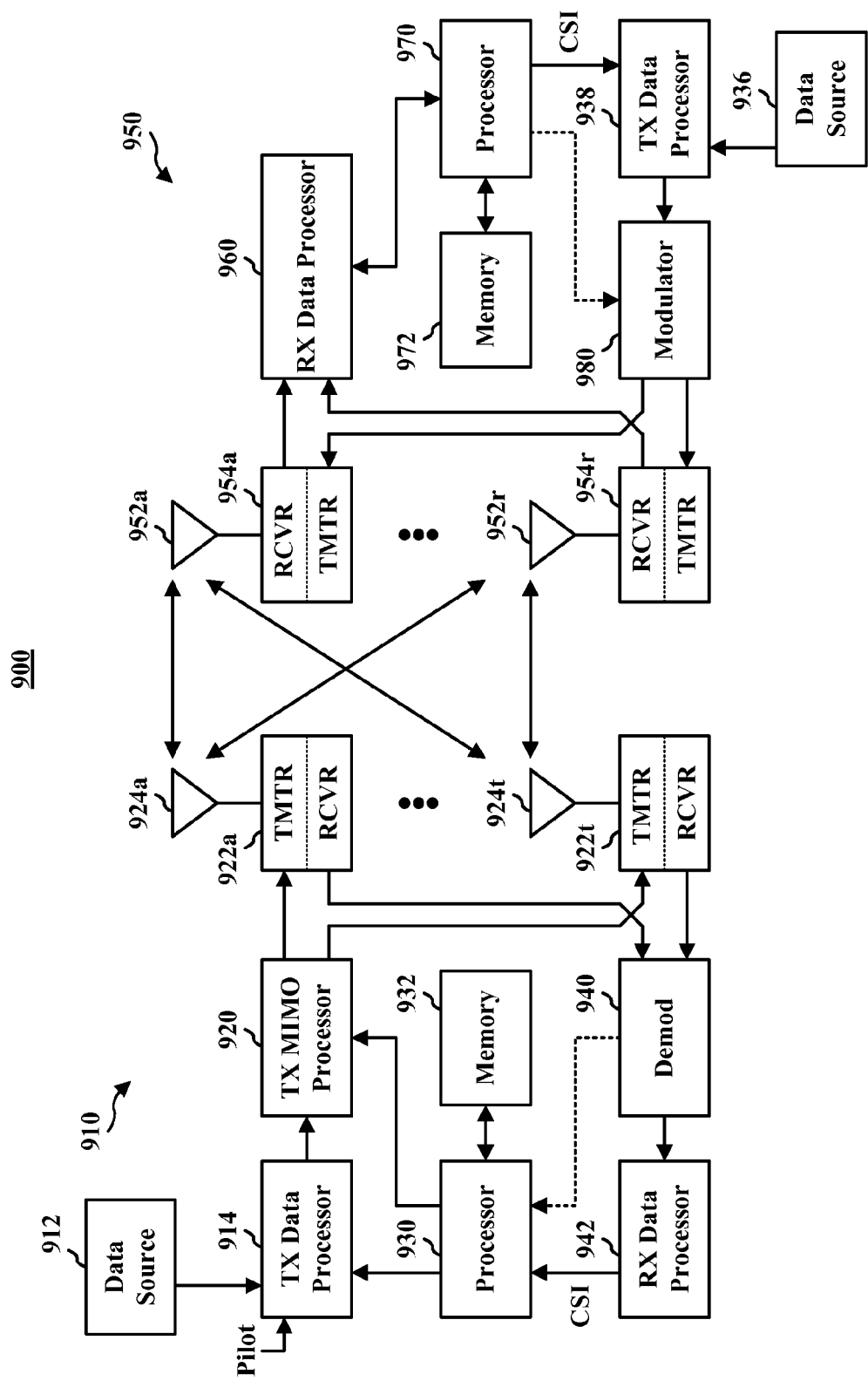
FIG. 9 is an illustration of an example wireless network environment that can be employed in conjunction with the various systems and methods described herein.

FIG. 9 shows an example wireless communication system 900. The wireless communication system 900 depicts one base station 910 and one mobile device 950 for sake of brevity. However, it is to be appreciated that system 900 can include more than one base station and/or more than one mobile device, wherein additional base stations and/or mobile devices can be substantially similar or different from example base station 910 and mobile device 950 described below. In addition, it is to be appreciated that base station 910 and/or mobile device 950 can employ the systems (FIGS. 1-3 and 7-8), examples (FIG. 4) and/or methods (FIGS. 5-6) described herein to facilitate wireless communication there between.

At base station 910, traffic data for a number of data streams is provided from a data source 912 to a transmit (TX) data processor 914. According to an example, each data stream can be transmitted over a respective antenna. TX data processor 914 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 950 to estimate channel response. The multiplexed pilot and coded data for each data stream can be modulated (e.g. symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 930.

The modulation symbols for the data streams can be provided to a TX MIMO processor 920, which can further process the modulation symbols (e.g., for OFDM). TX MIMO processor 920 then provides $N_T$ modulation symbol streams to $N_T$ transmitters (TMTR) 922a through 922t. In various embodiments, TX MIMO processor 920 applies beamforming weights to the symbols of the data streams and to the antenna from which the symbol is being transmitted.

Each transmitter 922 receives and processes a respective symbol stream to provide one or more analog signals, and further conditions (e.g. amplifies, filters, and upconverts) the analog signals to provide a modulated signal suitable for transmission over the MIMO channel. Further, $N_T$ modulated signals from transmitters 922a through 922t are transmitted from $N_T$ antennas 924a through 924t, respectively.

At mobile device 950, the transmitted modulated signals are received by $N_R$ antennas 952a through 952r and the received signal from each antenna 952 is provided to a respective receiver (RCVR) 954a through 954r. Each receiver 954 conditions (e.g., filters, amplifies, and downconverts) a respective signal, digitizes the conditioned signal to provide samples, and further processes the samples to provide a corresponding "received" symbol stream.

An RX data processor 960 can receive and process the $N_R$ received symbol streams from $N_R$ receivers 954 based on a particular receiver processing technique to provide $N_T$ "detected" symbol streams. RX data processor 960 can demodulate, deinterleave, and decode each detected symbol stream to recover the traffic data for the data stream. The processing by RX data processor 960 is complementary to that performed by TX MIMO processor 920 and TX data processor 914 at base station 910.

A processor 970 can periodically determine which preceding matrix to utilize as discussed above. Further, processor 970 can formulate a reverse link message comprising a matrix index portion and a rank value portion.

The reverse link message can comprise various types of information regarding the communication link and/or the received data stream. The reverse link message can be processed by a TX data processor 938, which also receives traffic data for a number of data streams from a data source 936, modulated by a modulator 980, conditioned by transmitters 954a through 954r, and transmitted back to base station 910.

At base station 910, the modulated signals from mobile device 950 are received by antennas 924, conditioned by receivers 922, demodulated by a demodulator 940, and processed by a RX data processor 942 to extract the reverse link message transmitted by mobile device 950. Further, processor 930 can process the extracted message to determine which precoding matrix to use for determining the beamforming weights.

Processors 930 and 970 can direct (e.g. control, coordinate, manage, etc.) operation at base station 910 and mobile device 950, respectively. Respective processors 930 and 970 can be associated with memory 932 and 972 that store program codes and data. Processors 930 and 970 can also perform computations to derive frequency and impulse response estimates for the uplink and downlink, respectively.

It is to be understood that the embodiments described herein can be implemented in hardware, software, firmware, middleware, microcode, or any combination thereof For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 10:
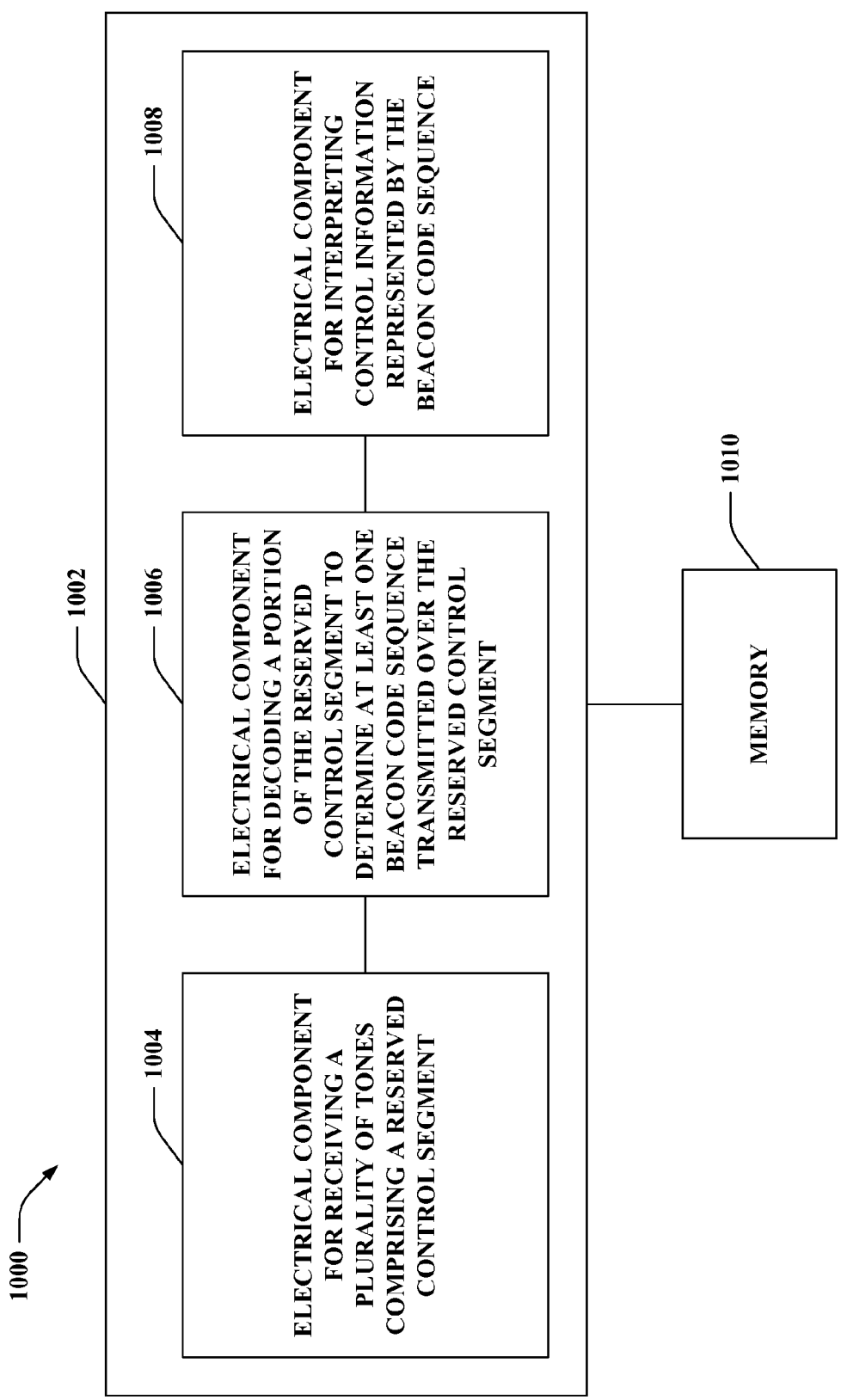
FIG. 10 is an illustration of an example system that receives control information in a wireless network.

With reference to FIG. 10, illustrated is a system 1000 that facilitates receiving control information in a wireless network. For example, system 1000 can reside at least partially within a base station, mobile device, etc. It is to be appreciated that system 1000 is represented as including functional blocks, which can be functional blocks that represent functions implemented by a processor, software, or combination thereof (e.g., firmware). System 1000 includes a logical grouping 1002 of electrical components that can act in conjunction. For instance, logical grouping 1002 can include an electrical component for receiving a plurality of tones comprising a reserved control segment 1004. For example, the beacon code sequence can comprise a plurality beacon symbols transmitted at various tones over one or more OFDM symbols. Further, logical grouping 1002 can comprise an electrical component for decoding a portion of the reserved control segment to determine at least one beacon code sequence transmitted over the reserved control segment 1006. For example, a transmitting device can choose the frequency tones to convey data, such as control information. In one example, an OFDM configuration can be used where the portion of bandwidth is a collection of contiguous OFDM symbols, and the beacon symbols are transmitted over a fraction of subcarriers of the OFDM symbols. The subcarrier position can indicate data (as a bit representation, for example). Moreover, logical grouping 1002 can comprise an electrical component for interpreting control information represented by the beacon code sequence 1008. Thus, as mentioned, the control information can be encoded in the sequence of beacon symbols based at least in part on the tones selected for the beacon symbols within the frequency. Additionally, system 1000 can include a memory 1010 that retains instructions for executing functions associated with electrical components 1004, 1006, and 1008. While shown as being external to memory 1010, it is to be understood that one or more of electrical components 1004, 1006, and 1008 can exist within memory 1010.

Figure 11:
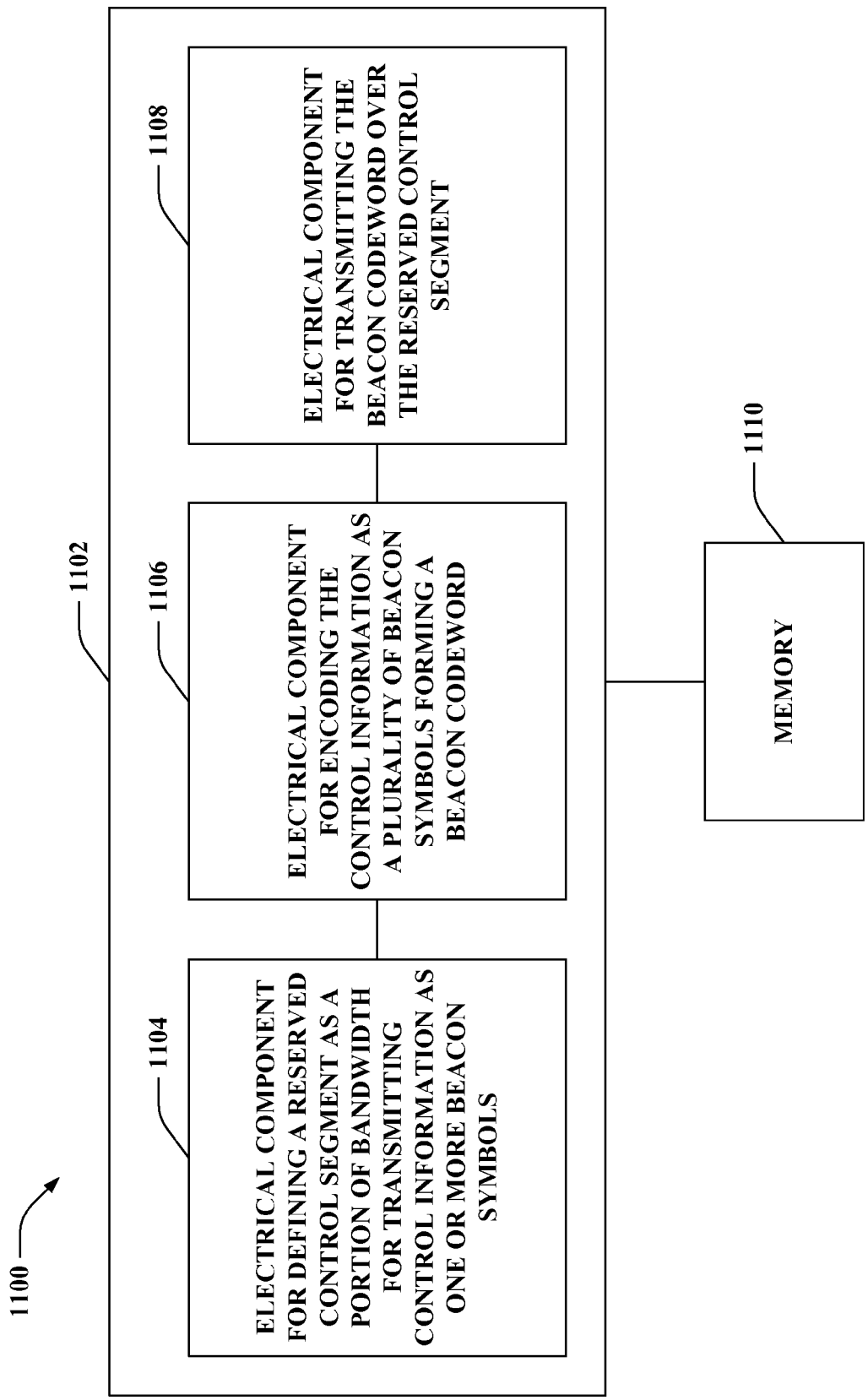
FIG. 11 is an illustration of an example system that transmits control information in a wireless network.

Turning to FIG. 11, illustrated is a system 1100 that communicates control information over beacon symbols in wireless networks. System 1100 can reside within a base station, mobile device, etc., for instance. As depicted, system 1100 includes functional blocks that can represent functions implemented by a processor, software, or combination thereof (e.g. firmware). System 1100 includes a logical grouping 1102 of electrical components that facilitate communicating the control information. Logical grouping 1102 can include an electrical component for defining a reserved control segment as a portion of bandwidth for transmitting control information as one or more beacon symbols 1104. The segment, as mentioned, can relate to a portion of frequency over a portion of time in a given time frame, which can be contiguous or non-contiguous, and can vary for given time frames. Moreover, substantially all similar wireless devices in a wireless network (e.g. mobile devices), or a portion thereof, can blank non-control information transmission on the reserved control segment to facilitate transmitting control information free from interference. Moreover, logical grouping 1102 can include an electrical component for encoding the control information as a plurality of beacon symbols forming a beacon codeword 1106. In this regard, the beacon codeword can represent the control information; in one example, the frequency tones chosen for the beacon symbols within the available bandwidth (e.g., with respect to frequency) can indicate information as described previously. Additionally, as described, the encoding can include applying error control coding to facilitate redundancy for more reliable decoding and prediction. Further, logical grouping 1102 can comprise an electrical component for transmitting the beacon codeword over the reserved control segment. Thus, the devices can transmit control information over the same portion of bandwidth using a multiple access scheme, such as transmitting as disparate beacon symbols or codewords. Additionally, system 1100 can include a memory 1110 that retains instructions for executing functions associated with electrical components 1104, 1106, and 1108. While shown as being external to memory 1110, it is to be understood that electrical components 1104, 1106, and 1108 can exist within memory 1110.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method that facilitates communicating control information in wireless networks, comprising:
   receiving a plurality of tones comprising a reserved control segment;
   differentiating a beacon code sequence from one or more disparately received beacon code sequences based at least in part on one or more error control coding schemes used to encode the beacon code sequence and the disparately received beacon code sequences;
   decoding the reserved control segment to infer at least one beacon code sequence transmitted over the reserved control segment; and
   interpreting control information represented by the beacon code sequence.

2. The method of claim 1, further comprising determining the beacon code sequence from a plurality of beacon symbols where the beacon symbols are identified at least in part by comparing a power of one or more of the beacon symbols and an estimated interference to a threshold.

3. The method of claim 1, wherein the beacon code sequences are scrambled based at least in part on an identifier related to a respective source of the beacon code sequences or a target for the beacon code sequences.

4. The method of claim 1, wherein the error control coding schemes comprise Reed-Solomon coding schemes, convolutional coding schemes, block coding schemes, and/or turbo coding schemes.

5. The method of claim 1, wherein differentiating is based at least in part on comparing a power or phase of beacon symbols within the beacon code sequence to that of beacon symbols within at least one of the disparately received beacon code sequences.

6. The method of claim 1, wherein the plurality of tones relate to one or more subcarriers clone or more OFDM symbols.

7. The method of claim 1, wherein the control information relates to an interference avoidance request.

8. A wireless communications apparatus, comprising:
   at least one processor configured to:
   receive a plurality of tones comprising a reserved control segment;
   differentiate a beacon code sequence from one or more disparately received beacon code sequences based at least in part on one or more error control coding schemes used to encode the beacon code sequence and the disparately received beacon code sequences;
   infer at least one beacon code sequence transmitted over the reserved control segment; and
   determine control information represented by the inferred beacon code sequence; and
   a memory coupled to the at least one processor.

9. The wireless communications apparatus of claim 8, wherein the at least one processor is further configured to infer the beacon code sequence from a plurality of beacon symbols and the beacon symbols are identified at least in part by comparing a power of one or more of the beacon symbols and an estimated interference to a threshold.

10. The wireless communications apparatus of claim 8, wherein the beacon code sequences are scrambled based at least in part on an identifier related to a respective source of the beacon code sequences or the wireless communications apparatus.

11. The wireless communications apparatus of claim 8, wherein the error control coding schemes comprise Reed-Solomon coding schemes, convolutional coding schemes, block coding schemes, and/or turbo coding schemes.

12. The wireless communications apparatus of claim 8, wherein the plurality of tones relate to subcarriers of one or more OFDM symbols.

13. A wireless communications apparatus for communicating control information in wireless networks, comprising:
   means for receiving a plurality of tones comprising a reserved control segment;
   means for differentiating a beacon code sequence from one or more disparately received beacon code sequences based at least in part on one or more error control coding schemes used to encode the beacon code sequence and the disparately received beacon code sequences;
   means for decoding a portion of the reserved control segment to determine at least one beacon code sequence transmitted over the reserved control segment; and
   means for interpreting control information represented by the beacon code sequence.

14. The wireless communications apparatus of claim 13, further comprising means for determining the beacon code sequence from a plurality of beacon symbols where the beacon symbols are identified at least in part by comparing a power of one or more of the beacon symbols and an estimated interference to a threshold.

15. The wireless communications apparatus of claim 13, wherein the beacon code sequences are scrambled based at least in part on an identifier related to a respective source of the beacon code sequences or the wireless communications apparatus.

16. The wireless communications apparatus of claim 13, wherein differentiating is based at least in part on comparing a power or phase of beacon symbols within the beacon code sequence to that of beacon symbols within at least one of the disparately received beacon code sequences.

17. The wireless communications apparatus of claim 13, wherein the plurality of tones relate to subcarriers of one or more OFDM symbols.

18. A computer program product, comprising:
a non-transitory computer-readable medium comprising:
code for causing at least one computer to receive a plurality of tones comprising a reserved control segment;
code for causing the at least one computer to differentiate a beacon code sequence from one or more disparately received beacon code sequences based at least in part on one or more error control coding schemes used to encode the beacon code sequence and the disparately received beacon code sequences;
code for causing the at least one computer to infer at least one beacon code sequence transmitted over the reserved control segment; and
code for causing the at least one computer to determine control information represented by the inferred beacon code sequence.

19. The computer program product of claim 18, the computer-readable medium further comprising code for causing the at least one computer to infer the beacon code sequence from a plurality of beacon symbols where the beacon symbols are identified at least in part by comparing a power of one or more of the beacon symbols and an estimated interference to a threshold.

20. A method for transmitting control information in wireless networks, comprising:
defining a reserved control segment as a portion of bandwidth for transmitting control information as one or more beacon symbols;
encoding the control information as a plurality of beacon symbols forming a beacon codeword utilizing an error control code to provide redundancy, wherein the error control code is scrambled based on an associated identifier to allow for unique identification of the beacon codeword; and
transmitting the beacon codeword over the reserved control segment.

21. The method of claim 20, further comprising blanking transmission of other data over the reserved segment.

22. The method of claim 21, wherein a portion of related devices blank transmission over the reserved segment to mitigate interference.

23. The method of claim 22, wherein a selected frequency tone for each of the plurality of beacon symbols relates to a portion of a codeword that comprises the control information.

24. The method of claim 20, wherein the portion of bandwidth is divided into a plurality of OFDM symbols and the beacon symbols forming the beacon codeword are transmitted on a subcarrier of each of the plurality of OFDM symbols.

25. The method of claim 20, wherein the control information relates to requesting blanking from a disparate transmitting device on a disparate portion of bandwidth.

26. The method of claim 20, wherein the control information relates to a request to avoid interference.

27. A wireless communications apparatus, comprising:
at least one processor configured to:
define a reserved control segment as a portion of bandwidth for transmitting one or more beacon symbols representing control information;
encode the control information as a plurality of beacon symbols forming a beacon codeword utilizing an error control code to provide redundancy, wherein the error control code is scrambled based on an associated identifier to allow for unique identification of the beacon codeword; and
transmit the beacon codeword over the reserved control segment; and
a memory coupled to the at least one processor.

28. The wireless communications apparatus of claim 27, wherein the at least one processor is further configured to blank transmission of other data over the reserved segment.

29. The wireless communications apparatus of claim 28, wherein a portion of related devices blank transmission over the reserved segment to mitigate interference.

30. The wireless communications apparatus of claim 27, wherein a selected frequency tone for each of the plurality of beacon symbols relates to a portion of a codeword that comprises the control information.

31. The wireless communications apparatus of claim 27, wherein the portion of bandwidth is divided into a plurality of OFDM symbols and the beacon symbols forming the beacon codeword are transmitted on a subcarrier of each of the plurality of OFDM symbols.

32. A wireless communications apparatus that facilitates transmitting control information in wireless networks, comprising:
means for defining a reserved control segment as a portion of bandwidth for transmitting control information as one or more beacon symbols;
means for encoding the control information as a plurality of beacon symbols forming a beacon codeword utilizing an error control code to provide redundancy, wherein the error control code is scrambled based on an associated identifier to allow for unique identification of the beacon codeword; and
means for transmitting the beacon codeword over the reserved control segment.

33. The wireless communications apparatus of claim 32, further comprising means for blanking transmission of other data over the reserved segment.

34. The wireless communications apparatus of claim 33, wherein a portion of related devices blank transmission over the reserved segment to mitigate interference.

35. The wireless communications apparatus of claim 32, wherein a selected frequency tone for each of the plurality of beacon symbols relates to a portion of a codeword that comprises the control information.

36. The wireless communications apparatus of claim 32, wherein the portion of bandwidth is divided into a plurality of OFDM symbols and the beacon symbols forming the beacon codeword are transmitted on a subcarrier of each of the plurality of OFDM symbols.

37. A computer program product, comprising:
a non-transitory computer-readable medium comprising:
code for causing at least one computer to define a reserved control segment as a portion of bandwidth for transmitting control information as one or more beacon symbols;
code for causing the at least one computer to encode the control information as a plurality of beacon symbols forming a beacon codeword utilizing an error control code to provide redundancy, wherein the error control code is scrambled based on an associated identifier to allow for unique identification of the beacon codeword; and
code for causing the at least one computer to transmit the beacon codeword over the reserved control segment.

38. The computer program product of claim 37, the non-transitory computer-readable medium further comprising code for causing the at least one computer to blank transmission of other data over the reserved segment.

* * * * *